United States Patent Office 3,297,477
Patented Jan. 10, 1967

3,297,477
HEAT-SEALABLE COMPOSITE SHEET
Edward Barkis, Philadelphia, and Thomas M. Quinn, Ridley Park, Pa., assignors to Avisum Corporation, Philadelphia, Pa., a corporation of Delaware
No Drawing. Filed Mar. 30, 1965, Ser. No. 444,037
5 Claims. (Cl. 117—138.8)

This invention relates to a coating composition and a composite sheet prepared with said coating composition. More particularly, this invention relates to an aqueous coating composition especially useful for coating oriented, thermoplastic base sheets.

When, for example, uncoated, oriented polypropylene film is heat-sealed, excessive shrinking causes unsatisfactory joints. Unoriented polypropylene film requires excessive heat to produce a tight seal which renders the film unsuitable for conventional regenerated cellulose film packaging equipment. Other thermoplastic films, such as those produced from polyethylene terephthalate react in a like manner to heat-sealing procedures. Coating these problem films with a composition which will melt at a suitable lower temperature is a means of overcoming the heat-sealing problem. However, development of useful compositions for this purpose is difficult since adhesion of the coating to the base, as well as other desirable coating properties, is not easily obtained. In addition, coating compositions found most suitable usually employ an organic solvent solution which creates some fire hazard and solvent inhalation problems.

It is a primary object of this invention to provide a composition which is useful for coating oriented thermoplastic base films and is applied thereto in an aqueous medium.

It is a further object of this invention to provide a coating composition which will lend heat-sealability to a base sheet and firmly adhere thereto.

It is still a further object of this invention to provide a composite, clear, heat-sealable, flexible, thermoplastic sheet having excellent blocking and slip characteristics.

These and other objects are realized in accordance with this invention which comprises a coating composition of an aqueous medium containing from about 5 to about 50% by weight of a homogeneous composition of (1) from 50 to 80%, based on the weight of the composition, of an interpolymer of from 50 to 60 wt. percent of a $C_1$–$C_4$ alkyl methacrylate, from 50 to 40 wt. percent of $C_1$–$C_4$ alkyl acrylate, and from 1 to 5 wt. percent of an acid selected from the group consisting of methacrylic, acrylic and itaconic acid, the individual monomer units not exceeding a total of 100%; (2) from 50 to 20%, based on the weight of the composition, of a compound selected from the group consisting of an adduct of rosin and an alpha-beta unsaturated dicarboxylic acid, and the partial esters of said adduct with a polyhydric alcohol; and (3) from 1 to 5%, based on the weight of the composition of a wax selected from the group consisting of paraffin wax and microcrystalline hydrocarbon wax, the components of the composition not exceeding a total of 100% by weight.

The above-mentioned $C_1$–$C_4$ alkyl methacrylates and acrylates are the methyl, ethyl, propyl and butyl methacrylates and acrylates.

The alpha-beta unsaturated dicarboxylic acid includes, for example, fumaric acid, maleic acid, maleic anhydride, citraconic acid, citraconic anhydride and mesaconic acid.

The partial esters of the adducts of rosin and an alpha-beta unsaturated dicarboxylic acid are formed with polyhydric alcohols which include, for example, ethylene glycol, propylene glycol, butylene glycol, diethylene glycol, triethylene glycol, tetraethylene glycol, glycerol, diglycerol ether, triglycerol ether, pentaerythritol, sorbitol and mannitol: Glycerol or mixtures containing active amounts of glycerol are preferred on the basis of availability and cost.

Rosin is ordinarily wood rosin or gum rosin, but may include equivalent materials, for example, abietic acid, crystalline abietic acid, isomerized rosin and polymerized rosin.

Microcrystalline hydrocarbon wax, in accordance with this invention includes, for example, acid purified microcrystalline wax from the bottom of crude oil tanks, solvent extracted microcrystalline wax, and oxidized microcrystalline wax obtained, for example, by first heating the wax in the presence of an alkaline catalyst and then further heating in the presence of oxygen. These waxes are high melting materials ranging from 150 to 195° F. Paraffin waxes, which have a melting point range of from about 90 to 150° F., may be used to replace all or a portion of the microcrystalline wax. Paraffin wax should preferably have a melting point in excess of 115° F.

Small amounts of emulsifying or dispersing agents may also be present in the aqueous coating medium of the invention. For example, the fatty acid partial esters of hexitans and polyoxyethylene derivatives thereof are useful for stabilizing the microcrystalline wax in the coating.

Water dispersible clays or the like may also be incorporated in the coating composition in amounts ranging from 1 to 5%, based on the weight of the solids.

A preferred coating composition of this invention comprises an aqueous medium containing from about 10 to 40% by weight of a homogeneous composition of (1) from 60 to 70%, based on the weight of the composition, of an interpolymer of from 50 to 60 wt. percent of methyl methacrylate, from 50 to 40 wt. percent of ethyl acrylate and from 1 to 5 wt. percent of methacrylic acid, the individual monomer units not exceeding a total of 100%; (2) from 40 to 30%, based on the weight of the composition, of the adduct of rosin and fumaric acid; and (3) from 2 to 3%, based on the weight of the composition, of a microcrystalline hydrocarbon wax, the components of the composition not exceeding a total of 100% by weight.

The invention also includes a composite sheet comprising an oriented, non-fibrous thermoplastic base sheet and a coating on at least one side thereof comprising a composition of (1) from 50 to 80%, based on the weight of the composition, of an interpolymer of from 50 to 60 wt. percent of a $C_1$–$C_4$ alkyl methacrylate, from 50 to 40 wt. percent of a $C_1$–$C_4$ alkyl acrylate and from 1 to 5 wt. percent of an acid selected from the group consisting of methacrylic, acrylic and itaconic acid, the individual monomer units not exceeding a total of 100%; (2) from 50 to 20%, based on the weight of the composition, of a compound selected from the group consisting of an adduct of rosin and an alpha-beta unsaturated dicarboxylic acid, and the partial esters of said adduct with a polyhydric alcohol; and (3) from 1 to 5%, based on the weight of the composition, of a wax selected from the group consisting of paraffin wax and microcrystalline hydrocarbon wax, the components of the composition not exceeding a total of 100% by weight.

In the preferred embodiment of this form of the invention, the composite sheet comprises a biaxially oriented polypropylene film and a coating on at least one side thereof comprising a composition of (1) from 60 to 70%, based on the weight of the composition, of an interpolymer of from 50 to 60 wt. percent of methyl methacrylate, from 50 to 40 wt. percent of ethyl acrylate and from 1 to 5 wt. percent of methacrylic acid, the individual monomer units not exceeding a total of 100%; (2) from 40 to 30%, based on the weight of the composition, of the adduct of rosin and fumaric acid; and (3) from 2 to 3%, based on the weight of the composition, of a microcrystalline hydrocarbon wax, the components of the composition not exceeding a total of 100% by weight.

The base film of this invention is a monoaxially or biaxially oriented thermoplastic resin film including polypropylene, polyethylene, polyethylene terephthalate, polycarbonate and the like. The surface of the base sheet is advantageously pretreated to improve adhesion between the coating and the base film. Anchoring treatments of the film surface include application of thin coatings of well known anchoring resins, acid or oxidizing treatments and electrical discharge treatment.

The acrylic interpolymer of this invention is advantageously formed by an emulsion polymerization technique and the aqueous product thereof used as a component of the aqueous coating composition. In general, the polymerization is carried out in a well known manner in an aqueous system containing the monomers to be copolymerized, an initiator and activator, e.g., ammonium persulfate and meta-sodium bisulfite, and a dispersing agent, e.g., sodium lauryl sulfate. At completion of the polymerization reaction the dispersion may be stabilized by the addition of a small amount of organic salt. If a more dilute mixture is desired additional water may be added.

The adduct of rosin and an alpha-beta unsaturated dicarboxylic acid is readily formed by adding the acid to molten rosin or its equivalent and holding in the molten state for adduct formation. In general, an amount of acid ranging from 10 up to 50%, preferably about 25%, based on the weight of the rosin is used. The adduct formed is a hard, high melting point modified rosin which in combination with the acrylic resin of this invention forms a very desirable coating for the clear, oriented base film. In addition, the rosin adduct is readily dispersed in aqueous alkaline solutions which is then compatible with the aqueous dispersion of acrylic interpolymer.

The partial esterification of the rosin-acid adduct may be carried out in any suitable manner. For example, it may be effected by heating a polyhydric alcohol or mixture thereof with the adduct at a temperature of about 250° C. in an inert atmosphere. In general, an amount of polyhydric alcohol is used to produce a partial ester having an acid number no lower than about 40. These partial esters of the adducts are also dispersible in aqueous alkaline solutions to provide clear solutions.

Both the rosin-acid adduct and the partial ester thereof are dispersed in an aqueous medium as follows:

An amount of water is heated to about 100° C. Ammonium hydroxide is added to the water in an amount to produce a pH of about 9 after the particular adduct or ester being used is added. While agitating the solution, an amount of finely-powdered adduct or partial ester thereof is added slowly and stirring is continued until a clear solution is formed. The solution is allowed to cool and, if it becomes cloudy, more ammonium hydroxide is added until it clears. The amount of adduct or partial ester added to the hot aqueous solution may vary from about 10 to about 50% by weight.

The wax is incorporated in the aqueous coating composition in the form of an emulsion. The wax emulsion may be formed as follows: Microcrystalline wax, for example, is melted and held at about 100° C. Emulsifying agents, for example, 6.8% of sorbitan monostearate and 8.5% of polyoxyethylene sorbitan monostearate, based on the weight of the wax, are added. When the wax and the emulsifiers are completely homogeneous and under agitation, boiling water is slowly added until a thick water-in-wax emulsion is formed. The addition of water is continued until inversion of the emulsion to a wax-in-water emulsion occurs. When the inversion occurs water may be added more rapidly. After the addition of water is complete, the emulsion is immediately cooled in an ice bath with mild agitation. This quenching produces a preferred particle size for the wax. Though wax particles of smaller or larger sizes will be adequate for coating systems used in some applications, the preferred average wax particle size ranges between 0.1 and 0.2 microns. This range is preferred since smaller wax particles than prescribed tend to become too soluble in the aqueous coating composition and will not migrate to the coating surface, thus effecting the cohesive properties of the coating causing lower heat-seal values and loss of slip characteristics. Larger particles tend to produce hazy films and higher initial heat-seal temperature requirements.

In general, the preparation of the aqueous coating composition is as follows: A weighed quantity of the aqueous solution containing the rosin-acid adduct or its partial ester is added to a weighed quantity of acrylic interpolymer latex with stirring. Additional water is added to bring the desired solids concentration to a range of from about 5 to about 50%, depending on the method of coating application to be used and the desired coating weight required. Then, sufficient wax emulsion is added to provide a concentration of wax, based on the other solid components, of about 1 to 5%.

The following example is set forth to demonstrate the aqueous coating composition and composite sheet of this invention.

*Example*

An aqueous coating composition was prepared by combining aqueous preparations as previously described herein to provide an aqueous medium containing 20% by weight of a homogeneous composition containing 65 parts of acrylic interpolymer resin, 35 parts of a rosin-fumaric acid adduct and 2.5 parts of a microcrystalline hydrocarbon wax.

An aqueous dispersion of acrylic interpolymer was prepared by emulsion polymerization of a monomer mixture of 54% by weight of methyl methacrylate, 43% by weight of ethyl acrylate and 3% by weight of methacrylic acid.

The rosin adduct was prepared by melting 100 parts of gum rosin and mixing 250 parts of fumaric acid into the melt for adduct formation. The adduct was dispersed in an aqueous alkaline solution as previously described.

The microcrystalline wax had a melting point of 180° F. and was emulsified as previously described herein.

The above coating composition was applied to biaxially oriented polypropylene films having a thickness of 0.6–0.7 mil and corona discharge treated to produce a drop number higher than 1.

The drop number may be briefly described as the tangent of the angle to which a flat sheet can be inclined before small drops of water will move or roll thereon.

The coating was first applied to one side of the base film using a gravure coating head. The sheet was forced air dried to produce 1.5 grams per square meter of coating.

The following properties resulted from this composite sheet:

Haze [1]—2
Slip—0.1 to 0.2 (coefficient of friction measurement)
Block [2]—None
Gloss—90% (percent reflectance)

[1] 98% light transmission—2% of light transmitted is scattered more than 2.5°.
[2] Films readily separate after storage for 16 hours under a pressure of 0.67 p.s.i.

Heat-seal strengths per 2 inches of width when using a sealing pressure of 1.5 pounds and a dwell time of ¾ sec. yielded the following gram strengths under the listed temperature when sealed coated side to coated side.

| 290°F | 280°F | 270°F | 260°F | 250°F |
|---|---|---|---|---|
| 500+[1] | 500+ | 500+ | 500+ | 500+ |

| 240°F | 210°F | 200°F | 190°F | 180°F |
|---|---|---|---|---|
| 500 | 500 | 500 | 400 | 200 |

[1] Full scale=500 grams—seals were in excess of this scale and film tearing occurred.

Coated side to uncoated side heat-seal strengths are 50 to 60 grams per 2 inches of width less through the given temperature range.

Using a two station gravure, both sides of the base film were coated to give a total of 3 grams per square meter of coating weight yielding similar heat-seal gradients to those noted above for coated to coated side films.

Heat-sealing of this composite sheet to both nitrocellulose and vinylidene chloride copolymer coated regenerated cellulose film gave heat-seal gradients equivalent to those noted above.

Passing this composite sheet along with a vinylidene chloride copolymer coated regenerated cellulose film between a heated nip roll results in an excellent heat lamination. This procedure eliminates the necessity for a laminating adhesive and greatly improves the low temperature impact properties of regenerated cellulose film as compared to a two ply regenerated cellulose film lamination.

The two-side coated composite sheet was run in various packaging machinery and found to work well without machine modifications. The film also has excellent release from heat-sealing jaws and generates a very low static charge.

If wax is omitted from the coating composition, blocking and slip characteristics are poor as well as release from heat-sealing jaws and machinability.

The combination of the acrylic interpolymer with the rosin-acid adduct produces a clear, firmly adhering coating on the oriented base sheet and provides a composite sheet which is heat-sealable at conventional heat-sealing temperatures.

Various changes and modifications may be made practicing the invention without departing from the spirit and scope thereof and, therefore, the invention is not to be limited except as defined in the appended claims.

We claim:

1. A composite sheet comprising an oriented thermoplastic base sheet and a coating on at least one side thereof comprising a composition of (1) from 50 to 80%, based on the weight of the composition, of an interpolymer of from 50 to 60 wt. percent of a $C_1$–$C_4$ alkyl methacrylate, from 50 to 40 wt. percent of a $C_1$–$C_4$ alkyl acrylate and from 1 to 5 wt. percent of an acid selected from the group consisting of methacrylic, acrylic and itaconic acid, the individual monomer units not exceeding a total of 100%; (2) from 50 to 20%, based on the weight of the composition of a compound selected from the group consisting of an adduct of rosin and an alpha-beta unsaturated dicarboxylic acid, and the partial esters of said adduct and a polyhydric alcohol; and (3) from 1 to 5%, based on the weight of the composition, of a wax selected from the group consisting of paraffin wax and microcrystalline hydrocarbon wax, the components of the composition not exceeding a total of 100% by weight.

2. The composite sheet of claim 1 wherein the alpha-beta unsaturated dicarboxylic acid is fumaric acid.

3. The composite sheet of claim 1 wherein the wax is a microcrystalline hydrocarbon wax dispersed at the surface of the coating and having an average particle size of 0.1 to 0.2 micron.

4. The composite sheet of claim 1 wherein the thermoplastic base sheet is a biaxially oriented polypropylene film.

5. A composite sheet comprising a biaxially oriented polypropylene base film and a coating on at least one side thereof comprising a composition of (1) from 60 to 70%, based on the weight of the composition, of an interpolymer of from 50 to 60 wt. percent of methyl methacrylate, from 50 to 40 wt. percent of ethyl acrylate and from 1 to 5 wt. percent of methacrylic acid, the individual monomer units not exceeding a total of 100%; (2) from 40 to 30%, based on the weight of the composition, of the adduct of rosin and fumaric acid; and (3) from 2 to 3%, based on the weight of the composition, of a microcrystalline hydrocarbon wax, dispersed at the surface of the coating and having an average particle size of 0.1 to 0.2 micron, the components of the composition not exceeding a total of 100% by weight.

References Cited by the Examiner

UNITED STATES PATENTS

| 2,551,087 | 1/1951 | Barnhart et al. | 260—67 |
| 2,760,542 | 8/1956 | Peterson et al. | 260—28.5 |
| 2,845,398 | 7/1958 | Brown et al. | 260—28.5 |
| 2,952,867 | 9/1960 | Driedrich et al. | 18—1 |
| 3,057,812 | 10/1962 | Straughan et al. | 260—29.6 |
| 3,100,760 | 8/1963 | Brown et al. | 260—86.1 |

OTHER REFERENCES

Harris: Encyclopedia of Chemical Technology, December 1953, pages 789–792 relied on.

LEON J. BERCOVITZ, *Primary Examiner.*

F. McKELVEY, *Assistant Examiner.*